(12) United States Patent
Renard et al.

(10) Patent No.: US 7,206,546 B2
(45) Date of Patent: Apr. 17, 2007

(54) METHOD OF REJECTING INTERFERENCE DISTURBING THE RECEPTION OF A SATELLITE RADIO SIGNAL

(75) Inventors: Alain Renard, Chabeuil (FR); Stéphane Monrocq, Valence (FR)

(73) Assignee: Thales, Neuilly sur Seine (FR)

( * ) Notice: Subject to any disclaimer, the term of this patent is extended or adjusted under 35 U.S.C. 154(b) by 416 days.

(21) Appl. No.: 10/879,709

(22) Filed: Jun. 30, 2004

(65) Prior Publication Data
US 2005/0042998 A1    Feb. 24, 2005

(30) Foreign Application Priority Data
Jul. 1, 2003    (FR)    ................................. 03 07979

(51) Int. Cl.
*H04B 1/00*    (2006.01)
*H04B 15/00*    (2006.01)

(52) U.S. Cl. ............... 455/63.1; 455/67.11; 455/67.13; 455/67.14; 375/229; 375/148; 370/335; 370/342

(58) Field of Classification Search .............. 455/63.1, 455/67.11, 67.13, 67.14, 68, 69, 70; 375/229, 375/148; 370/335, 342
See application file for complete search history.

(56) References Cited

U.S. PATENT DOCUMENTS

| | | | |
|---|---|---|---|
| 5,781,152 A | 7/1998 | Renard et al. | |
| 5,822,376 A | 10/1998 | Renard | |
| 5,850,420 A | 12/1998 | Guillard et al. | |
| 6,081,691 A | 6/2000 | Renard et al. | |
| 6,317,078 B1 | 11/2001 | Renard et al. | |
| 6,345,177 B1 | 2/2002 | Renard et al. | |
| 6,414,949 B1 * | 7/2002 | Boulanger et al. | 370/335 |
| 6,876,698 B1 * | 4/2005 | Dick et al. | 375/229 |
| 2006/0120439 A1 * | 6/2006 | Smee et al. | 375/148 |
| 2006/0146925 A1 * | 7/2006 | Birru | 375/233 |

FOREIGN PATENT DOCUMENTS

| | | |
|---|---|---|
| FR | 01 16399 | 12/2001 |
| FR | 02 00163 | 1/2002 |

OTHER PUBLICATIONS

Convergence of the SMI and the Diagonally Loaded SMI Algorithms with Weak Interference p. 394-399 IEEE Transactions on Antennas and Propagation 38 (1990) Mar. No. 3, NY US.
On Robust Capon Beamforming and Diagonal Loading, Jian Li, Petre Stoica, Zhisong Wang Jun. 4, 2004.

* cited by examiner

*Primary Examiner*—Matthew Anderson
*Assistant Examiner*—Tuan Pham
(74) *Attorney, Agent, or Firm*—Lowe Hauptman & Berner, LLP

(57) ABSTRACT

The invention proposes a method of rejecting interference disturbing the reception by means of a reception system, of a signal emanating from a transmission system, the method comprising a calculation for weighting the signals $S_i(t)$, i varying from 1 to K, emanating from the reception system, based on the intercorrelation matrix Rss for the signals $S_i(t)$, the matrix Rss comprising on its diagonal the autocorrelation terms of the signals $S_i(t)$. The method is chiefly one wherein the weighting calculation comprises a step consisting in modifying the autocorrelation terms of the diagonal of the matrix Rss.

20 Claims, 4 Drawing Sheets

METHOD OF REJECTING INTERFERENCE DISTURBING THE RECEPTION OF A SATELLITE RADIO SIGNAL

RELATED APPLICATIONS

The present application is based on, and claims priority from, French Application No. 03 07979, filed Jul. 1, 2003, the disclosure of which is hereby incorporated by reference herein in its entirety.

FIELD OF THE INVENTION

The invention relates to a method of rejecting interference disturbing the reception of a signal emanating from a transmission system.

The field of the invention is that of the rejection of interference disturbing the reception of transmission signals, in particular signals of GPS (Global Positioning System) type.

BACKGROUND-DESCRIPTION OF THE RELATED ART

In the case of interference originating from a given direction, a solution consists in disposing an array of sensors and in weighting the various channels of the sensors so as to partially or totally reject the disturbing signal originating from this direction. This therefore involves a spatial weighting.

Various adaptive algorithms currently exist for calculating the weights to be allocated to the various channels in order to decrease the impact of interference; rejection is generally performed.

Iterative algorithms are known, such as the Appelbaum algorithm, the stochastic gradient algorithm, the least squares algorithm, . . . , based on minimizing the mean square error or on maximizing the signal-to-noise ratio.

Another solution consists in applying the power inversion algorithm also called the Capon algorithm based on minimizing the power at the output of the array of sensors. This algorithm may also be used in instantaneous mode (also known as "snapshot" mode) or in an iterative implementation. The main steps of the Capon algorithm in instantaneous mode will be described.

Represented diagrammatically in FIG. 1 is an array of sensors $C_i$ receiving a disturbing signal modeled by an incident plane wave of wavelength $\lambda$.

At the output of the array of K sensors, the signal $S_{out}$ is of the form:

$$S_{out}(t) = W_{app1}S_1 + W_{app2}S_2 + \ldots, \text{ i.e.}$$

$$S_{out}(t) = \sum_{i=1}^{K} (W_{app_i} \cdot S_i(t))$$

$W_{appi}$ being the gain (or weighting) $W_i$ applied to sensor $C_i$ and $S_i$ being the time signal originating from sensor $C_i$.

The output power P of the type $E[|S_{out} \cdot S^*_{out}|]$, E being the expectation integrated over a long time (tending to infinity), is expressed in the form:

$$P = W_{app}^{H} \cdot R_{SS} \cdot W_{app},$$

with $W_{app} = (W_{app1}, W_{app2} \ldots W_{appK})$, $W_{app}^H$ representing the hermitian (that is to say the conjugate transpose) of the weighting vector $W_{app}$, and $R_{SS}$ being the correlation matrix for the signals $S_i$ of the various sensors.

$$R_{SS} = \begin{bmatrix} r_{11} & r_{21} & \cdots & r_{K1} \\ r_{12} & r_{22} & \cdots & \\ \cdots & \cdots & & \\ r_{1K} & \cdots & & r_{KK} \end{bmatrix}$$

with $r_{ik}(t) = S_i(t) \cdot S_k^H(t)$.

A trivial solution making it possible to minimize the power P is: $W_{app} = 0$. To avoid this trivial solution, a constraint C is imposed on the weighting coefficients. For example, a possible constraint is such that:

$W_{app} \cdot C = 1$.

The solution under the constraint C is given by:

$$W_{cal} = \frac{R_{SS}^{-1} C}{C^H R_{SS}^{-1} C}$$

and we have: $W_{app} = W_{cal}^*$.

The rejections obtained by the various algorithms are illustrated in FIG. 2: the iterative algorithms result in a lowering of the level of the interference "Int" virtually to the level of the thermal noise (case a of FIG. 2) and the Capon algorithm lowers the level of the interference under the level of the thermal noise to a value symmetric with the starting value (case b of FIG. 2). The limit of sensitivity of these algorithms is fixed with respect to the thermal noise.

These algorithms then exhibit difficulties of rejection for interference whose power is low, but already sufficient to degrade the performance of the receivers.

SUMMARY OF THE INVENTION

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

An important aim of the invention is therefore to propose a method making it possible to reject the interference especially of low power, disturbing the reception of a transmission signal.

To achieve this aim, the invention proposes a method of rejecting interference disturbing the reception by means of a reception system, of a signal emanating from a transmission system, the method comprising a calculation for weighting the signals $S_i(t)$, i varying from 1 to K, emanating from the reception system, based on the intercorrelation matrix $R_{SS}$ for the signals $S_i(t)$, the matrix $R_{SS}$ comprising on its diagonal the autocorrelation terms of the signals $S_i(t)$. The method is mainly one wherein the weighting calculation comprises a step consisting in modifying the autocorrelation terms of the diagonal of the matrix $R_{SS}$.

As the power of the noise only comes into the autocorrelation terms (if we integrate over an infinite time), that is to say into the diagonal of the matrix, it is possible by modifying these terms to control the sensitivity of the rejection algorithms (which depends on the noise) and/or to adapt the level of rejection of the interference to the desired application.

According to a characteristic of the invention, the modification of the terms of the diagonal comprises a step for rendering the terms of the diagonal equal to a constant, for example equal to 1.

One thus obtains the same contribution from the power of the noise on the various channels i.

K may be the number of sensors of the reception system and $S_i(t)$ the time signal emanating from sensor i. According to a characteristic of the invention, $S_i(t)$ may furthermore itself be determined as a function of M time intervals, each sensor being sampled over time.

The reception system may comprise just one sensor sampled over time: K is the number of time intervals and $S_i(t)$ the time signal emanating from the sensor and corresponding to interval i.

The invention also relates to a receiver of a signal emanating from a transmission system and apt to be disturbed by interference, comprising at least one sensor and linked to this (or each) sensor, a device comprising at least one element able to weight the signal emanating from the corresponding sensor and, linked to the weighting element(s), a processor able to implement the described method.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

Other characteristics and advantages of the invention will become apparent on reading the detailed description which follows, given by way of nonlimiting example and with reference to the appended drawings in which.

DESCRIPTION OF THE PREFERRED EMBODIMENT

Figure 1:
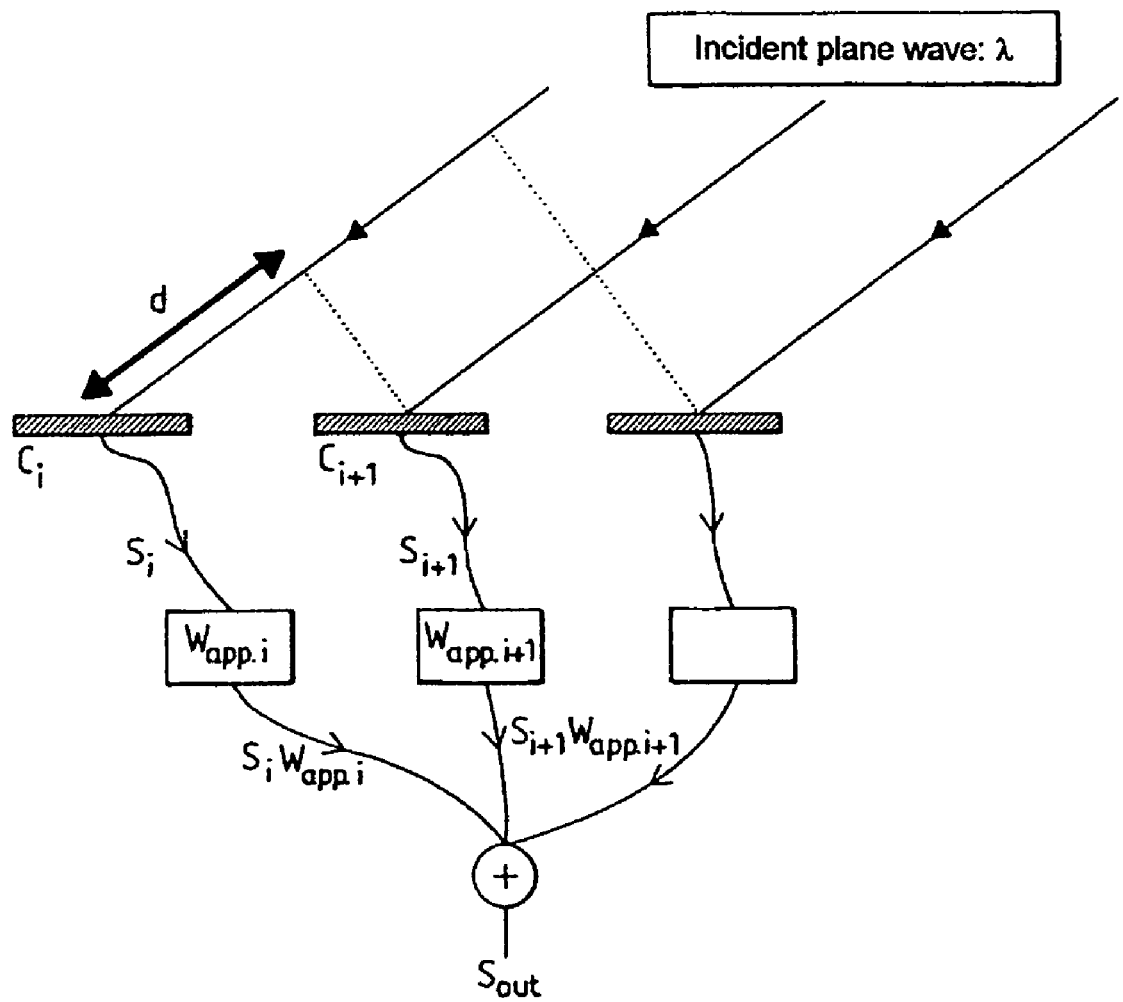
FIG. 1 already described diagrammatically represents an array of sensors receiving a disturbing signal modeled by an incident plane wave and of output signal $S_{out}$, FIG. 2 already described diagrammatically illustrates the rejections obtained by the iterative algorithms (case a) and by the Capon algorithm (case b), FIG. 3 diagrammatically illustrates the rejections obtained by the iterative algorithms (case a) and by the Capon algorithm (case b) on the basis of the method according to the invention, FIG. 4 diagrammatically represents a receiver according to the invention in the case of spatial rejection, FIG. 5 diagrammatically represents a receiver according to the invention in the case of temporal rejection, FIG. 6 diagrammatically represents a receiver according to the invention in the case of spatio-temporal rejection.
Figure 2:
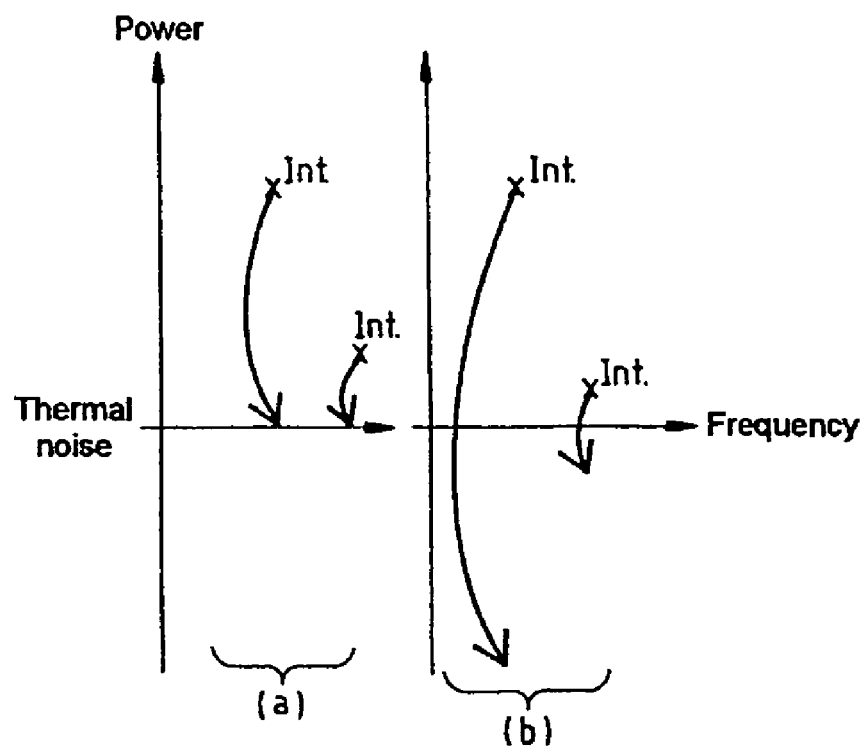

The invention will firstly be described on the basis of the instantaneous Capon algorithm and by considering the transmission signal to be a satellite radio signal.

By neglecting the very weak satellite radio signal and assuming unit gain for the various channels I (including gain of sensor i), the signal $S_i(t)$ may be expressed in the form:

$$S_i(t) = A_i e^{-j\left(\omega t + \varphi + \frac{d_i}{\lambda}\right)} + b_i(t)$$

with $\omega$ the frequency of the disturbing signal $\varphi$ its phase $\lambda$ its wavelength $A_i$ the amplitude of the disturbing signal seen on sensor i $d_i$ the difference in path length between sensor i and sensor k $b_i(t)$ the thermal noise received on sensor i.

Consequently, the cross-correlation of the signal between sensor i and sensor k may be written:

$$r_{ik}(t) = S_i(t) \cdot S_k^H(t) =$$
$$A_i A_k e^{j\frac{d_k - d_i}{\lambda}} + b_i(t) \cdot A_k e^{j\left(\omega t + \varphi + \frac{d_k}{\lambda}\right)} + b_k^H(t) \cdot A_i e^{-j\left(\omega t + \varphi + \frac{d_i}{\lambda}\right)} + b_i(t) \cdot b_k^H(t)$$

The autocorrelation on sensor i is therefore expressed in the form:

$$r_{ii}(t) =$$
$$S_i(t) \cdot S_i^H(t) = A_i^2 + b_i(t) \cdot A_i e^{j\left(\omega t + \varphi + \frac{d_i}{\lambda}\right)} + b_i^H(t) \cdot A_i e^{-j\left(\omega t + \varphi + \frac{d_i}{\lambda}\right)} + \|b(t)\|^2$$

The expectation E of the $r_{ik}$ may then be written:

$$E[r_{ik}] =$$
$$A_i A_k e^{j\frac{d_k - d_i}{\lambda}} + E[b_i b_k^H] = A_i A_k e^{j\frac{d_k - d_i}{\lambda}} + E[b_i]E[b_k^H] = A_i A_j e^{j\frac{d_k - d_i}{\lambda}}$$
$$E[r_{ii}] = A_i^2 + E[b_i^2] = A_i^2 + P_{i\text{-noise}}$$

since the noise is white, independent and of zero mean. The power of the noise only comes into the autocorrelation terms, that is to say into the diagonal of the matrix $R_{SS}$.

By integrating over a long time which tends to infinity, the matrix $R_{SS}$ may then be written in the form:

$$R_{SS_{1 \to \infty}} = \begin{bmatrix} A_1^2 + P_{1-noise} & A_1 A_2 C_{21} & \cdots & A_1 A_K C_{K1} \\ A_2 A_1 C_{12} & A_2^2 + P_{2-noise} & \cdots & \\ \cdots & & \cdots & \\ A_K A_1 C_{1K} & & \cdots & A_K^2 + P_{K-noise} \end{bmatrix}$$

with $C_{ik} = e^{j\frac{d_k - d_i}{\lambda}}$.

Hitherto we have assumed unit gain on each channel. In reality each channel i exhibits a certain gain $G_i$ and $r_{ii}$ may be written:

$$r_{ii} = G_i^2(A_i^2 + P_{i\text{-noise}}).$$

The power of the noise does not therefore come into each channel equitably. To obtain the same contribution of the power of the noise on the various channels, the matrix can be normalized in the following manner.

We put $r_{ii}=g_i^2$.

We can calculate all the $g_i$, i=1 to K $$r_{ik}^{normalized} = \frac{r_{ik}^{before}}{g_i \cdot g_k}$$

The normalized matrix $R_{SS}$ may then be written:

$$R_{SS}^{normalized} = \begin{bmatrix} 1 & r_{21}^{normalized} & \ldots & r_{K1}^{normalized} \\ r_{12}^{normalized} & 1 & \ldots & \\ \ldots & \ldots & & \\ r_{1K}^{normalized} & \ldots & & 1 \end{bmatrix}$$

This matrix can be multiplied by $A_1^2+P_{1\text{-}noise}$ to facilitate the next step of shaping of the matrix. We then obtain:

$$R_{SS}^{normalized} = (A_1^2 + P_{1-noise}) \begin{bmatrix} 1 & r_{21}^{normalized} & \ldots & r_{K1}^{normalized} \\ r_{12}^{normalized} & 1 & \ldots & \\ \ldots & \ldots & & \\ r_{1K}^{normalized} & \ldots & & 1 \end{bmatrix}$$

The terms of the diagonal of the matrix are now normalized (that is to say mutually equal) to 1 or to $A_1^2+P_{1\text{-}noise}$: the power of the noise thus has the same contribution on the various channels.

The normalization is a step of shaping of the matrix which, applied to a weighting algorithm, makes it possible to improve the rejection performance; however, the shaping presented in the next paragraph can be performed without normalization.

To adapt the rejection to the desired application, the autocorrelation terms are modified, for example by the subtraction of a diagonal matrix.

In the case of the non-normalized correlation matrix, we then obtain:

$$R_{SS_{1 \to \infty}} = \begin{bmatrix} A_1^2 + P_{1-noise} & A_1A_2C_{21} & \ldots & A_1A_KC_{K1} \\ A_2A_1C_{12} & A_2^2 + P_{2-noise} & \ldots & \\ \ldots & \ldots & & \\ A_KA_1C_{1K} & \ldots & & A_K^2 + P_{K-noise} \end{bmatrix} - \begin{bmatrix} P_1 & 0 & \ldots & 0 \\ 0 & P_2 & & \\ \ldots & & & \\ 0 & \ldots & 0 & P_K \end{bmatrix}$$

In the case of the correlation matrix normalized to 1, we then obtain:

$$R_{SS}^{final} = R = \begin{bmatrix} 1 & r_{21}^{normalized} & \ldots & r_{K1}^{normalized} \\ r_{12}^{normalized} & 1 & \ldots & \\ \ldots & \ldots & & \\ r_{1K}^{normalized} & \ldots & & 1 \end{bmatrix} - P \begin{bmatrix} 1 & 0 & \ldots & 0 \\ 0 & 1 & & \\ \ldots & & & \\ 0 & \ldots & 0 & 1 \end{bmatrix}$$

with P<1.

For 0<P<1, this amounts to decreasing the noise power which appears in the autocorrelation terms: rejection would therefore be better. When part of the noise is deducted in this way, we must make certain that the rejection does not exceed a threshold beyond which the GPS signals would also be rejected and also does not exceed a threshold beyond which $R_{SS}$ is no longer reversible.

For P<0, we artificially increase the power of the noise (that is to say we introduce a fictitious noise), thereby stabilizing the matrix and therefore the rejection.

P may be determined according to several procedures, for example as a function of the estimated power of the noise.

One may also wish to decrease the rejection in the case for example where no fairly long integration time is available: one then increases the level of the diagonal for example by an addition.

It is also possible to modify the rejection as a function of criteria other than the estimated power of the noise or than the integration time. It is for example possible to modify it as a function of the power of the GPS signal received.

It is also possible to modify the rejection as a function of criteria determined at the start of the weighting processing and remaining unchanged during this processing; according to a variant of the invention, the criteria may also be determined adaptively during processing.

It is also possible to modify the autocorrelation terms of the normalized or non-normalized matrix by multiplication of these terms by a vector.

Once the matrix has been shaped, the Capon algorithm is then applied and the following weighting vector $W_{cal}$ is obtained:

$$W_{cal} = \frac{R_{SS}^{final-1}C}{C^H R_{SS}^{final-1} C}$$

Figure 3:
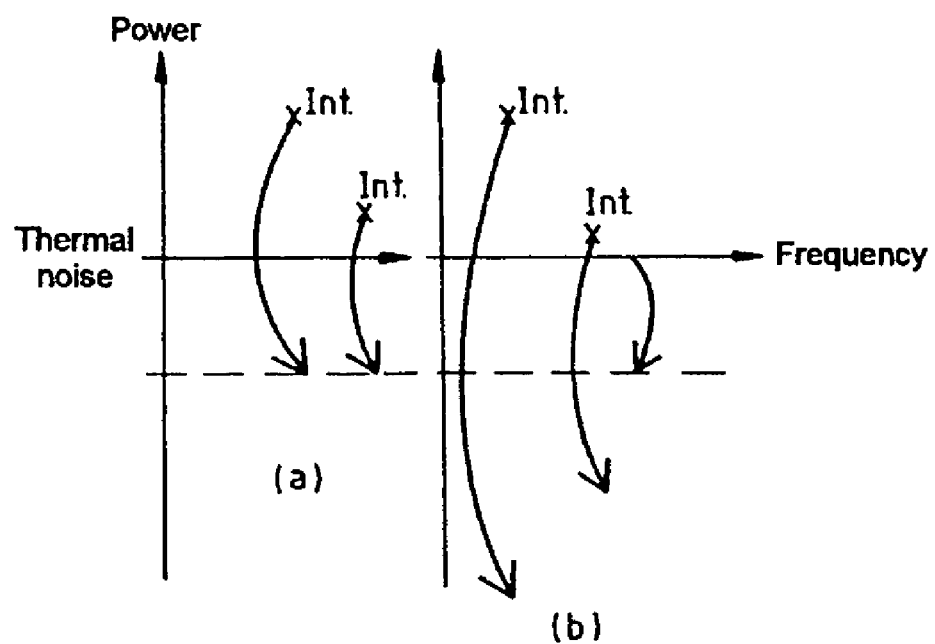

The rejections thus obtained are illustrated in FIG. 3 (case b).

An exemplary application to the Capon algorithm of the method according to the invention has been shown.

The method according to the invention applies likewise to the iterative algorithms. The latter comprise a step of calculating the correlation of the signals between the channels, a step of calculating the weighting to be applied by means of the chosen algorithm and a step of applying the weighting to the various channels for the rejection of interference. The weight assigned to each channel is updated by taking account of the set of previous weights and at each iteration, the rejection of the interference increases and then stabilizes. For these algorithms also, the calculation of the weighting is based on the intercorrelation of signals, for example in the form of a matrix. Just as the method according to the invention is applied to the Capon algorithm through a shaping of the correlation matrix, so it is applied to the iterative algorithms through a modification of the correlation elements by decreasing (or increasing) the value of the autocorrelation terms.

The rejections thus obtained are illustrated in FIG. 3 (case a).

Hitherto we have considered a spatial weighting of the signals emanating from an array of sensors.

Figure 5:
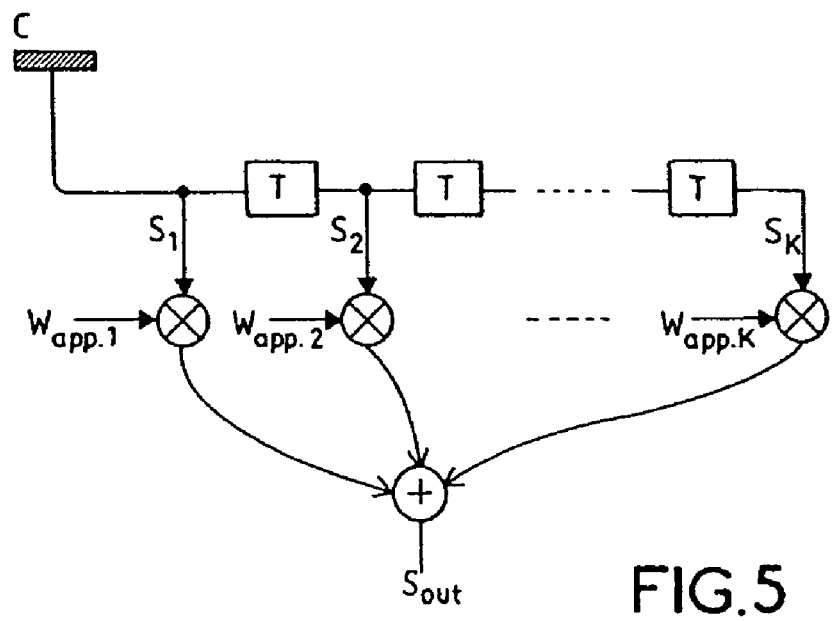

The method according to the invention applies likewise to a temporal weighting of signals emanating from a sensor sampled over time. The K time signals $S_1, \ldots, S_i, \ldots, S_K$ originate from the same sensor C and correspond to K different time intervals T as illustrated in FIG. 5. The time intervals are also designated by time shifts. The subsequent processing is then identical to that presented for the spatial processing, the weighting being performed on the various signals shifted over time by the vector $W_{app}$ determined as previously by $$W_{cal} = \frac{R_{SS}^{final-1} C}{C^H R_{SS}^{final-1} C} \text{ and } W_{app} = W_{cal}*$$

and the final signal takes the form:

$$S_{out}(t) = \sum_{i=1}^{K} (W_{app_i} \cdot S_i(t)).$$

Figure 6:
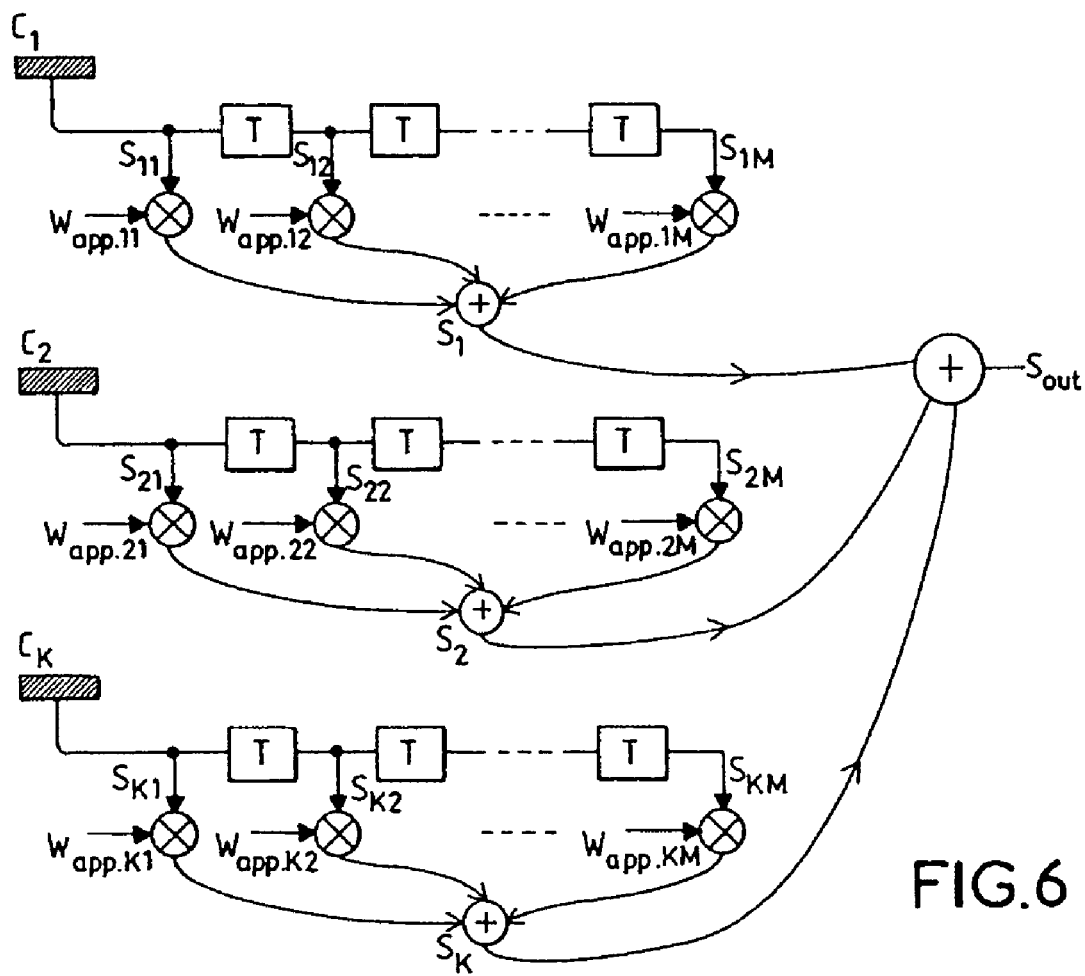

More generally, the method according to the invention applies to a spatio-temporal weighting of signals emanating from an array of sensors $C_1, \ldots, C_i, \ldots, C_K$, each sensor being sampled over time as illustrated by FIG. 6.

The signal $S_i(t)$ of sensor i is then expressed in the form:

$$S_i(t) = s_{i1}(t) \cdot W_{appi1} + s_{i2}(t) \cdot W_{appi2} + \ldots + s_{ij}(t) \cdot W_{appij} + \ldots + s_{iM}(t) \cdot W_{appiM},$$

$S_{ij}(t)$ being the signal emanating from sensor i and corresponding to the time shift j, $w_{ij}$ being the weighting of sensor i and corresponding to time shift j, M being the number of time intervals of sensor i. Each sensor has the same number M of time shifts T.

The signal $S_{out}$ is then expressed in the form:

$$S_{out}(t) = \sum_{i=1}^{K} \sum_{j=1}^{M} (W_{app_{ij}} \cdot s_{ij}(t))$$

K being the number of sensors.

The correlation matrix $R_{SS}$ for the signals of each sensor and of each time shift may then be written as follows:

$$R_{ss} = \begin{bmatrix} r_{11/11} & r_{11/12} & \cdots & r_{11/1M} & r_{11/21} & r_{11/22} & \cdots & r_{11/2M} & \cdots & r_{11/K1} & r_{11/K2} & \cdots & r_{11/KM} \\ r_{12/11} & r_{12/12} & & \vdots & \vdots & \vdots & & & & \vdots & & & \vdots \\ \vdots & & \ddots & \vdots & \vdots & \vdots & & & & \vdots & & & \vdots \\ r_{1M/11} & \cdots & \cdots & r_{1M/1M} & \vdots & \vdots & & & & \vdots & & & \vdots \\ r_{21/11} & \cdots & \cdots & \cdots & r_{21/21} & \vdots & & & & \vdots & & & \vdots \\ r_{22/11} & \cdots & \cdots & \cdots & \cdots & r_{22/22} & & & & \vdots & & & \vdots \\ \vdots & & & & & & \ddots & & & \vdots & & & \vdots \\ r_{2M/11} & & & & & & & r_{2M/2M} & & \vdots & & & \vdots \\ \vdots & & & & & & & & \ddots & \vdots & & & \vdots \\ r_{K1/11} & \cdots & \cdots & \cdots & \cdots & \cdots & \cdots & \cdots & \cdots & r_{K1/K1} & & & \vdots \\ r_{K2/11} & & & & & & & & & & r_{K2/K2} & & \vdots \\ \vdots & & & & & & & & & & & \ddots & \vdots \\ r_{KM/11} & \cdots & \cdots & \cdots & \cdots & \cdots & \cdots & \cdots & \cdots & \cdots & \cdots & \cdots & r_{KM/KM} \end{bmatrix}$$

with $r_{ij/np}(t) = s_{ij}(t) \cdot s_{np}^H(t)$, i and n corresponding respectively to sensors i or n and varying from 1 to K, j and p corresponding respectively to time shifts j or p and varying from 1 to M.

The correlation terms are made up of the product of the signals of each sensor and of each time shift, i.e. for K sensors and M time shifts, a total of $(KM)^2$ terms.

In this case also the autocorrelation terms are modified as a function of the desired application.

The transmission signal may be a satellite radio signal such as for example a GPS signal, a GALILEO signal or a signal originating from any other satellite based positioning system. The transmission signal may emanate from any RF or other transmission system, optical for example.

Figure 4:
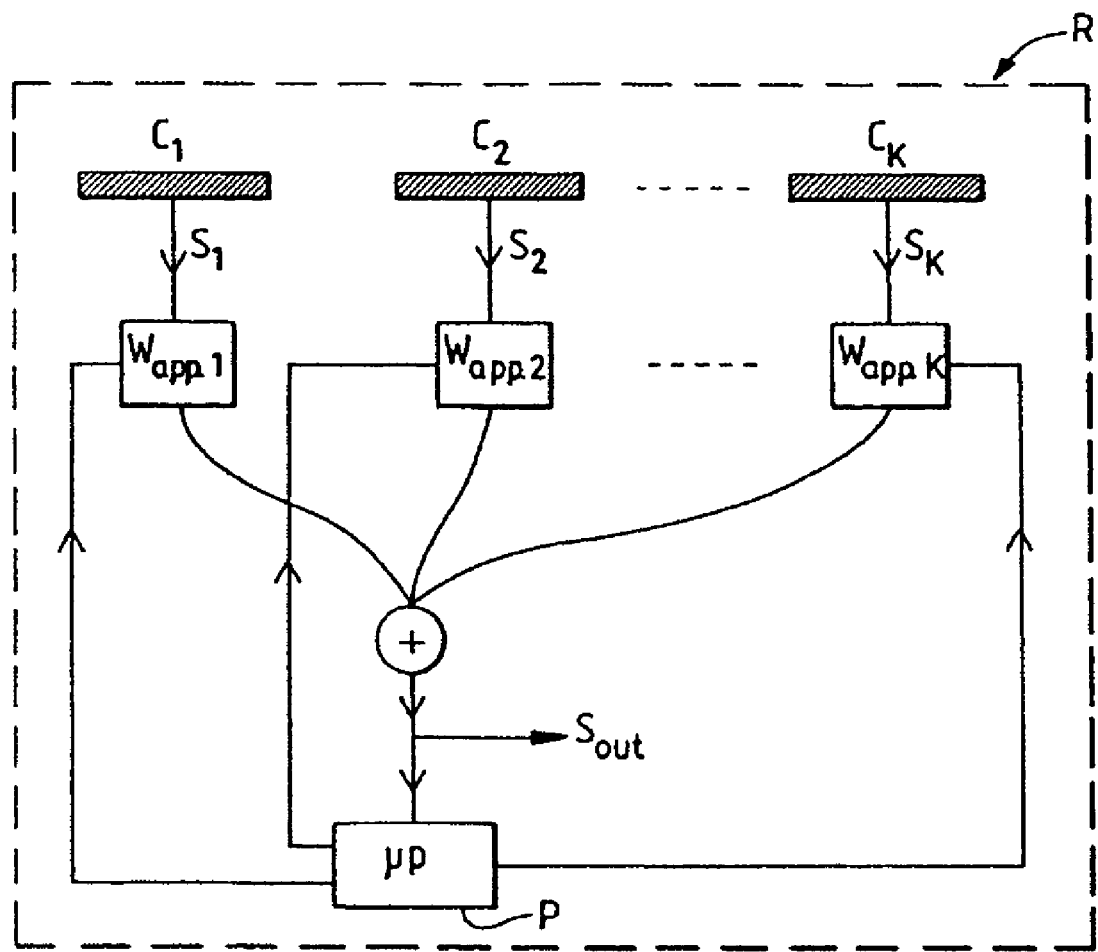

The invention also relates to a receiver R able to implement the method described. Represented in FIG. 4 is a receiver R in the case of spatial rejection. It comprises K sensors $C_1, \ldots C_K$ and linked to each sensor $C_i$, a device comprising at least one element $W_{appi}$ able to weight the signal $S_i(t)$ emanating from corresponding sensor $C_i$ and, linked to the weighting element(s) $W_{appi}$, a processor P able to implement the method described.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A method of rejecting interference disturbing the reception by a reception system comprising the step of:
receiving a signal emanating from a transmission, system, calculating a weighting of signal $S_i(t)$, i varying from 1 to K, emanating from the reception system, based on an intercorrelation matrix $R_{ss}$ for the signals $S_i(t)$, the intercorrelation matrix $R_{ss}$ comprising autocorrelation terms of the signals $S_i(t)$ on its diagonal, said calculating step comprising:

modifying the autocorrelation terms of the diagonal of the matrix $R_{ss}$, said modifying step comprising:

normalizing the modified autocorrelation terms including rendering the terms of the diagonal of matrix $R_{ss}$ equal to a constant.

2. The method as claimed in claim 1, wherein the constant is 1.

3. The method as claimed in claim 2, wherein the reception system comprises K sensors and $S_i(t)$ is the time signal emanating from sensor i.

4. The method as claimed in claim 2, wherein the modified matrix is used in applications of interference processing based on minimization of the power of the interference.

5. The method as claimed in claim 1, wherein said modifying step comprises at least one of subtracting a predetermined diagonal matrix from the matrix Rss and of multiplying the matrix Rss by a predetermined vector.

6. The method as claimed in claim 1, wherein the signal is disturbed by thermal noise, the autocorrelation terms of the diagonal of the matrix Rss are modified as a function of the estimated power of the thermal noise.

7. The method as claimed in claim 1, wherein the correlation matrix is calculated over a determined integration time, the autocorrelation terms of the diagonal of the matrix Rss are modified as a function of the integration time.

8. The method as claimed in claim 1, wherein the signal received from the transmission system exhibits a determined power, the autocorrelation terms of the diagonal of the matrix Rss are modified as a function of the power of the signal.

9. The method as claimed in claim 1, wherein the modifying is adaptive.

10. The method as claimed in claim 1, wherein the reception system comprises a sensor sampled over time, $S_i(t)$ corresponds to a time signal emanating from the sensor after i time interval and K is the number of time intervals.

11. The method as claimed in claim 1, wherein the reception system comprises K sensors and $S_i(t)$ is the time signal emanating from sensor i.

12. The method as claimed in claim 11, wherein each sensor i is sampled over time, M is the number of time intervals of the sensor i and the signal $S_i(t)$ is of the form:

$$S_i(t) = S_{i1}(t) \cdot W_{appi1} + S_{i2}(t) \cdot W_{appi2} + \ldots + S_{ij}(t) \cdot W_{appij} + \ldots + S_{iM}(t) \cdot W_{appiM},$$

$S_{ij}(t)$ is the signal emanating from sensor i and corresponding to a time interval j, $W_{appij}$ is the weighting applied to sensor i and corresponding to time interval j.

13. The method as claimed in claim 1, wherein the signal emanating from the transmission system is at least one of a satellite radio signal an RF signal, and an optical signal.

14. The method as claimed in claim 1, wherein the modified matrix is used in applications of interference processing based on minimization of the power of the interference.

15. The method as claimed in claim 1, wherein the processing is based on an algorithm of Capon type or of iterative type.

16. A receiver of a signal emanating from a transmission system and apt to be disturbed by interference, comprising at least one sensor and a device linked to the sensor the device comprising at least one element arranged to weight the signal emanating from the corresponding sensor and a processor linked to the weighting element, a processor arranged to perform the method according to claim 1.

17. The receiver as claimed in claim 16, comprising K sensors.

18. The receiver as claimed in claim 16, said receiver comprises, for each sensor, M time shift elements.

19. The receiver of a signal emanating from a transmission system and apt to be disturbed by interference, comprising at least one sensor and a device linked to the sensor, the device comprising at least one element arranged to weight the signal emanating from the corresponding sensor, and a processor linked to the weighting element, a processor arranged to perform the method according to claim 2.

20. The receiver of a signal emanating from a transmission system and apt to be disturbed by interference, comprising at least one sensor and a device linked to the sensor, the device comprising at least one element arranged to weight the signal emanating from the corresponding sensor, and a processor linked to the weighting element, a processor arranged to perform the method according to claim 14.

* * * * *